July 2, 1957 E. J. HERBENAR 2,797,929
SHOCK INSULATED STEERING LINKAGE
Filed Feb. 2, 1954
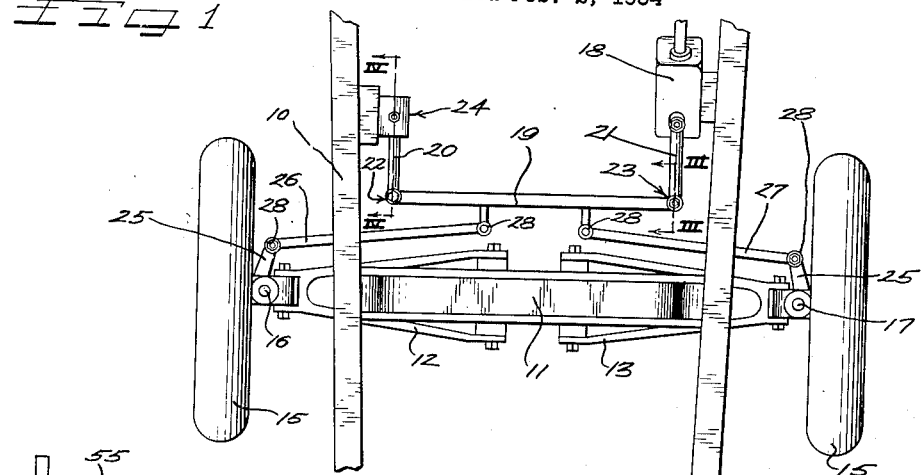
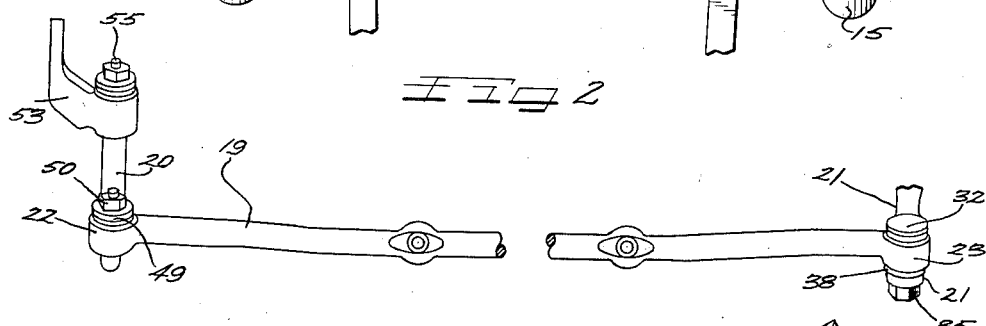
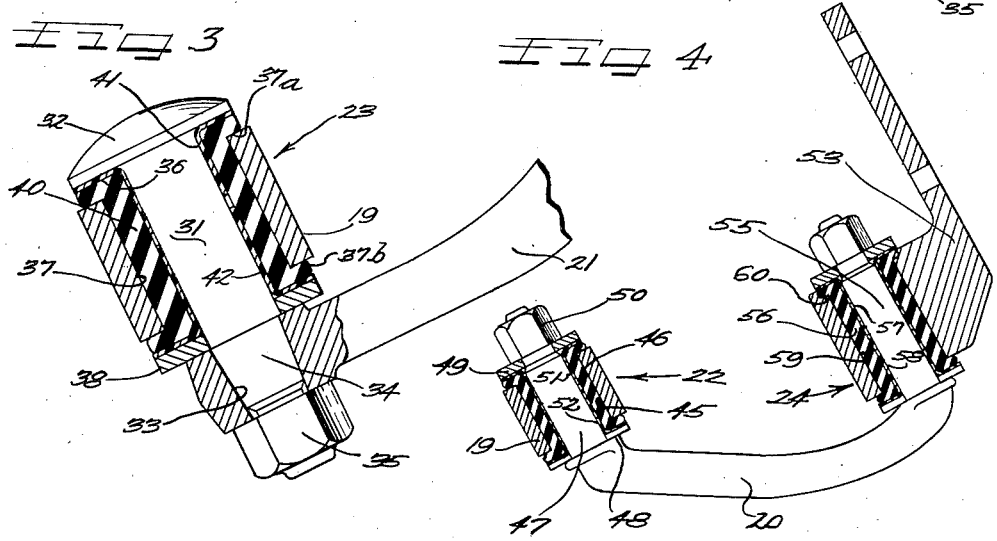
Inventor
Edward J. Herbenar

United States Patent Office 2,797,929
Patented July 2, 1957

2,797,929
SHOCK INSULATED STEERING LINKAGE

Edward J. Herbenar, Detroit, Mich., assignor to Thompson Products, Inc., Cleveland, Ohio, a corporation of Ohio Application February 2, 1954, Serial No. 407,715

6 Claims. (Cl. 280—95)

The present invention relates to linkages for the control of dirigible wheels. More particularly, the invention relates to a novel resiliently jointed steering linkage that is self-lubricating and inherently vibration dampening, for use in the control of steered wheels or the like.

Automotive steering linkages, and especially those utilized in modern vehicles designed for high speeds and having independently sprung wheels, require a steering linkage capable of absorbing severe vibrational loads while at the same time providing resiliency in the steering system sufficient to prevent the transmittal of impacts to the steering wheel from the vehicle wheels. While it has been considered desirable that the above characteristics be found in steering systems it is also absolutely essential that the physical safety of the steering system be maintained at a very high level and, therefore, that the joints and connecting points in the steering linkage be incapable of separation.

While prior art structures have utilized resilient joints in vehicle steering linkages, to my knowledge, such prior art structures have not included a substantially 100% rubber mounted joint capable of use in modern vehicles without extremely rapid deterioration. On the other hand, the present invention contemplates the provision of a rubber mounting in which a semi-resilient material, such as, for example, nylon, is provided between the rubber mounting and the steel pivot pins of the various portions of the steering linkage. This novel arrangement provides a joint in which the natural resiliency of rubber is retained, and yet in which the deterioration ordinarily accompanying rubber is substantially eliminated through the provision of self-lubricating nylon bushings. By providing a sleeve of nylon material or the like between the pivot pin of the steering linkage members and the cooperating socket having rubber therein, a rotatable fit is obtained in which the rotation of the pivot pin is applied against the nylon rather than the rubber, and in which relatively low rotation is provided between the nylon and the rubber. Thus, rotation is provided between the pivot pin and the accompanying socket without the usual abrading of the rubber itself.

Prior art systems utilizing rubber were forced either to bond the rubber joint material to both the socket and the pivot pin, or bond the rubber to the socket and a metallic sleeve insert. In such an arrangement it was found substantially impossible to load the rubber bushing portions axially since the inner liner or shell was bonded to it and was substantially incompressible. Further, in order to provide a substantially frictionless steering system it was necessary that lubricant means be provided at the steering joints. This latter provision necessitated the extra cost of lubricating fittings and the lubricant also caused a deterioration of the rubber parts over a period of time. While there have been some developments which permit the manufacture of resilient plastic materials only mildly subject to attack by mineral oils, nevertheless such materials, when completely resistant to such materials, are extremely expensive.

On the other hand, however, the joint arrangement of the present invention permits a preloading of a resilient linkage joint both axially and radially, while at the same time preventing abrading action between the pivot pin of the joint and the resilient material of the socket. Further, the present invention provides materials that are self-lubricating without the presence of mineral oils, thereby preventing deterioration of the resilient material in the joint, whether it is subject to attack by mineral oils or not. Further, through the use of the present invention, it is possible to provide a steering linkage that is substantially isolated from the vehicle frame and steering column, as far as the transmission of vibrations imparted to the dirigible wheels by the road or steering vibrations, are concerned.

It is, therefore, an object of the present invention to provide a novel resiliently jointed steering linkage for steerable wheels and capable of dampening road shocks without transmitting them to the steering wheel.

A further object of the present invention is to provide a novel resiliently jointed steering linkage capable of absorbing vibrations imparted to the steering linkage without transmitting them to the vehicle frame or steering column.

Yet another object of the present invention is to provide a novel resilient joint for use in steering linkage systems and which comprises a preloaded resilient socket having a nylon bushing inserted therein for contact with a cooperating metal pivot pin.

Another object of the present invention is to provide a steering linkage having resiliently constructed joints having metal-to-nylon contacting wear areas and preloaded resilient bushing areas for absorbing rotational and non-rotational wear respectively.

Yet a further object of the present invention is to provide a novel U-shaped, resiliently hung, balanced, idler arm for steering systems.

Yet a further object of the present invention is to provide a compressed, resilient joint having transverse and axial resiliency, while simultaneously providing and unbonded, rotational contact between the pivot pin of said joint and a protective material between said resilient material and said pivot pin.

A feature of the present invention is a multiple-piece substantially tubular, semi-resilient nylon liner for positioning between the pivot pin of a joint and a resilient socket member associated therewith.

Another feature of the present invention is the provision of a U-shaped idler arm mounted in both axially and radially resilient bushings, in a steering linkage whereby proper alignment with minimum wear is provided.

Another object of the present invention is to provide a simplified steering linkage for automotive vehicles in which all metal-to-metal bearing surfaces are eliminated without at the same time decreasing the resistance of the linkage joints to wear.

A feature of the present invention is a spool-shaped resilient bushing capable of withstanding axial loads applied by the steering linkage pivot pins, as well as canting loads supplied during linkage operation.

Another feature of the invention is the provision of a pair of axial and radial thrust bearings composed of nylon mounted between a resilient backing bushing and a joint pivot pin mounted for rotation therein.

Other and further objects and features will at once become apparent to those skilled in the art from a consideration of the attached drawing, wherein:

Figure 1 is a fragmentary plan view of the dirigible wheels of an automotive vehicle illustrating the incorporation of the present invention therein;

Figure 2 is an end elevational view of the drag link and idler arm elements of the steering linkage constructed according to the present invention;

Figure 3 is an enlarged side elevational view of the pitman arm of the steering linkage of the present invention and taken along the line III—III of Figure 1; and Figure 4 is an enlarged view of the idler arm construction of the present invention and the bushings associated therewith, taken along the line IV—IV of Figure 1.

As shown on the drawings:

As may be seen from Figure 1, the novel resilient linkage of the present invention is mounted on a conventional automotive vehicle having a frame 10 supporting a front cross member 11 which in turn pivotally supports wheel support arms 12 and 13. The support arms 12 and 13 may be of any conventional design and are constructed to support wheels 15 for vertical movement when the vehicle is in operation. Pivotally hinged to the supports 12 and 13 are wheel spindles 16 and 17. These spindles support the wheels 15 for rotation about a substantially vertical axis for steering purposes.

To the above outlined conventional vehicle structure, a linkage is added for transmitting steering forces from the steering apparatus 18 to the wheel 15. This linkage comprises a generally reciprocable drag link 19 pivotally mounted to an idler arm 20 and a pitman arm 21 by means of resilient joints 22 and 23, respectively. The drag link is in turn connected to the steering arms 25 of the wheels 15 by means of tie rods 26 and 27 and the tie rods 26 and 27 are connected to the steering arms 25 and the drag link 19 by means of universal joints 28 of conventional nature. This universal action at the joints 28 permits the transmission of forces from the drag link 19 to the steering arms 25 independently of the vertical position of the wheels as a result of the pivoting action of the supports 12 and 13 and also independent of the position of the drag link 19 relative to the frame members 10 and 11.

The drag link 19 is pivotally mounted by the shock dampening resilient joints 22 and 23 in a manner more clearly illustrated in Figures 3 and 4. As may be seen from Figure 3, the joint 23, which connects the drag link 19 to the pitman arm 21 is illustrated in larger detail. As may there be seen, a pivot stud 31 having an enlarged, flanged head 32, is secured in the tapered recess or bore 33 of the pitman arm 21. The tapered bore 33 with the complementary tapered stud 34 on the pin 31 are of conventional construction and provide a wedge-type non-rotatable joint when the nut 35 is tightened down to draw the stud 34 snugly into the tapered bore 33.

The head 32 of the stud 31 is sufficiently large that it provides an annular stop surface 36 of a diameter larger than the diameter of the aperture 37 in the drag link 19. By the addition of a thrust washer 38 an annular thrust surface is provided on the end of the pitman arm 21. Thus the thrust surfaces 36 and 38 are coupled with the resilient spool-shaped bushing 40 cooperating with the bushing 40 and the drag link 19 to provide a snug, resilient, pivot connection in which movement of the drag link 19 axially of the stud 31 is limited to small increments.

It is, of course, absolutely necessary that there be no play or sloppiness, in the joints 22 and 23. For this reason, the resilient bushing 40 is preloaded in assembly so that it tightly grips the walls of the aperture 37 as well as the end surfaces 37a and 37b thereof. Such a preloading action would ordinarily cause a tight non-rotational gripping of the stud 31 by the resilient bushing 40 if no provision for rotation were provided between the stud and the bushing. However, the present invention contemplates a novel semi-resilient bearing construction. By means of a pair of plastic bearings or bushing liners 41 and 42, positioned between the stud 31 and the bushing 40, the gripping action ordinarily associated with rubber bushings such as 40 is prevented from binding against the stud 31. However, the snugness provided by the preloaded bushing 40 is retained, since the plastic utilized in the bushings 41 and 42 is of the semi-resilient type, such as, for example, nylon. Although it is possible to utilize other semi-resilient plastics for this purpose, it is preferred that nylon be utilized since it has been found through tests that nylon will provide a definite self-lubricating function when utilized in the joint herein disclosed.

As above noted, it has been discovered that nylon bushings of relatively thin sections, such as shown at 41 and 42, will, when urged snugly against a hard metal surface such as used in the stud 31, powder slightly on attempted rotation between the bushings and the stud. This powdery material will actually operate in somewhat the same fashion as a plurality of tiny ball bearings and will permit rotation of the stud 31 relative to the connecting drag link 19 without substantial distortion of the bushing 40 in the form of twist. Further, although the initial rotation imparted to the stud will cause the powdering effect on the nylon bushing, it has been found that once the powdered condition has been established, substantially no further wear takes place between the stud 31 and the nylon and, hence, an extremely long lived joint is provided.

It is, of course, to be understood that the above discussed powdering action is not dependent upon the presence of any lubricant and, in fact, it is intended that the joint be operated in a dry condition. It is to be noted, however, that the presence of water in such a plastic bearing will not adversely affect its operation. Further, in view of the fact that the joint is not a grease-requiring one, the material of which the bushing 40 is constructed may be varied over a much wider range than those theretofore usable in grease-type joints. Thus, the joints of the present invention will operate satisfactorily over long periods of time utilizing some of the resilient materials that are attacked by some greases, for example, natural rubber and certain synthetics. It is, however, preferred that resilient material uneffected by grease be utilized in automotive installations in order to prevent the possibility of deterioration as a result of stray grease and oils from the automotive engine or other conventional, lubricated parts.

In installation, the semi-resilient bushing liners 41 and 42 adjust themselves on the stud 31 axially as the stud is drawn into the conical aperture 33 and tightened. In order to permit the preloading of the resilient bushing 40 without interference from the nylon semi-resilient bushings 41 and 42, the bushings 41 and 42 are constructed to have a combined length slightly shorter than the final preloaded length of the bushing 40.

It is to be noted that adjustments may be made in the preloading of the bushing 40 through the use of shims between the washer 38 and the pitman arm 21, or, similarly, through the use of washers 38 having varying thicknesses. Likewise, the scope of the present invention includes structures in which the thrust washer 38 or, alternatively, the stud head 32 are adjustably threaded or otherwise adjustably mounted on the stud 31 to permit their axial adjustment therealong to provide an adjusted preloaded condition of the resilient bushing 40. A further modification coming within the scope of the present invention is the construction of the liner sleeves 41, 42, 51, 52 to lie between the bushings and the bores 37 and 48 rather than between the bushings and the studs 31 and 47. This change will, of course, cause the bushings to be fixed relative to the studs rather than to the drag link 19.

As may be seen from Figure 4, the joint 22 is constructed in a manner substantially identical to the joint 23 shown in Figure 3. Thus, the drag link 19 is provided with an aperture 45 in which a spool-shaped, preloaded resilient bushing 46 is mounted. The U-shaped idler arm 20 is provided with an extension stud 47 rigidly secured thereto or, if desired, integral therewith. The stud 47 is provided with an abutment washer 48 and carries a second washer 49 similar to washer 38 which is compressed against the resilient bushing 46 by means of a conventional nut 50. As in the arrangement shown in Figure 3, the resilient bushing 46 is separated from the stud 47 by the semi-resilient plastic bushing liners 51 and 52 which adjust themselves axially relative to the stud 47 upon the application of compressive forces by the nut 50.

The end of the idler arm 20 that is pivotally secured to the frame 10 at 24 by the bracket 53 comprises a joint substantially identical to the joint 22 and the joint 23. As may be seen, it comprises a stud 55 mounted in a resilient bushing 56 but separated therefrom by semi-resilient plastic liner bushings 57 and 58. The bushing 56 is supported in the aperture 59 in the bracket 53 in a manner similar to joints 22 and 23 above described, except that, as may be seen, a countersunk recess 60 is provided at the upper aperture to the bore 59. This countersink may be utilized with the joints 22 and 23, if desired, and is shown merely as a modified form that may be found desirable when it is felt necessary to cover the resilient bushing 56 from exposure to surrounding greases, etc., or, on the other hand, when it is desired to provide a substantially exact positioning of the pivot point in the bracket 53.

By providing countersunk recesses in the bracket 53, at one end or the other of the bore 59, the position of the link 20 may, of course, be varied substantially. Through the use of this expedient, the linkage parts such as the idler arm 20 may be utilized in a relatively wide variety of automotive frame arrangements by merely modifying the bracket, rather than the bushings or the forged link members.

From the above-noted arrangement, it will be apparent that the drag link 19 is resiliently, yet very firmly mounted. It has been found that the preloaded resilient bushings of the present invention provide greatly improved vibration damping joints. The use of a semi-resilient material as a bushing liner, which material has a self-lubricating quality, has permitted the use of a preloaded, and hence very snug resilient joint, while at the same time retaining a relatively free pivotal action that does not unduly add to the steering resistance. Although the steering resistance is maintained at a relatively low level, the thin lining permits the resilient portion of the bushing firmly to grasp the pivot studs and, as a result, no slack or sloppiness is permitted in the system.

An important aspect of the linkage above disclosed and described is that it will permit small amounts of twisting of the drag link 19, thereby preventing binding when the drag link 19 is deflected from road impacts, flying stones, or other similar obstacles. Such impacts will also be substantially isolated from the pitman arm 21 through the resiliency of the bushings and in view of the preloaded condition of the bushings, vibrations initiated by such impacts will be rapidly dampened out.

While only the idler arm and pitman arm joints have been illustrated as comprising the resilient joint shown in Figures 3 and 4, it is to be understood that the present invention contains within its scope, the construction of joints 28 in a manner similar to joints 22, 23 and 24. It will be apparent, however, that the resilient joints 22 and 23 shown in Figures 3 and 4, are not fully universal in action and, hence, in independently sprung vehicles in which the steering arms 24 and 25 will move through substantial vertical paths, and in which the vehicle springs are relatively resilient so as to permit rapid fluctuations in the position of the steering arms and, hence, the drug links 26 and 27, it is usually preferred that conventional universal-type joints be utilized. It has been found that stabilization of the drag link 19 through the resilient, free-turning joints of the present invention, will provide a substantially stabilized steering system having very good damping qualities even though the joints 28 are not of the resilient dampening type.

It will be understood, of course, that variations and modifications may be made in the structure disclosed herein without departing from the novel concepts thereof.

I claim as my invention:

1. In an automotive vehicle having a frame and a pair of dirigible wheels, a steering linkage comprising a steering column operatively connected to a pitman arm, an idler arm pivotally connected to said frame, a drag link pivotally connected to said pitman arm and to said idler arm for substantial reciprocatory motion in response to forces applied thereto by said pitman arm, and tie rods connecting said drag link to each of said dirigible wheels, said tie rod being connected to said pitman arm and to said idler arm by resilient, preloaded vibration dampening joints, each of said joints having a preloaded bushing of resilient material positioned between the pivoted joint members and a thin-walled bushing liner constructed of semi-resilient flexible self-lubricating plastic positioned between the bushing and one of the joint members and snugly urged by said bushing against said one joint member.

2. A resilient shimmy damping joint comprising a first control member and a second control member mounted for pivotal movement relative to each other, one of said members having a stud secured thereto and the other of said members having a bore extending therethrough for cooperation with said stud, resilient bushing means positioned within said bore between said stud and said other member, and a thin-walled semi-resilient flexible self-lubricating plastic liner positioned between said bushing and said stud, said bushing being preloaded to provide a force conforming said liner snugly to said stud to thereby provide a snug wear take-up bearing fit between said members.

3. A resilient shimmy damping joint comprising a first control member and a second control member mounted for pivotal movement relative to each other, one of said members having a stud secured thereto and the other of said members having a bore extending therethrough for cooperation with said stud, a spool-shaped resilient bushing having radially extending end flanges cooperating with the ends of said aperture, a thin-walled semi-resilient flexible self-lubricating plastic liner positioned at all points between said bushing and said stud, and means for preloading said bushing axially thereof.

4. A resilient joint comprising a first member having an aperture therein, a second member having a projecting stud thereon, a resilient bushing fixedly mounted in said first member and extending a distance greater than the effective length of said aperture, an abutment on said projecting stud, a second abutment on the end of said projecting stud whereby said bushing may be preloaded by adjusting said second abutment to compress said bushing between said second abutment and said first abutment, and a thin-walled semi-resilient flexible self-lubricating plastic bushing liner positioned between said stud and said resilient bushing for a snug bearing fit with said stud.

5. A resilient joint comprising a first member having an aperture therein, a second member having a projecting stud thereon, a resilient bushing mounted in said aperture and extending a distance greater than the effective length of said aperture, an abutment on said projecting stud, a movable abutment on the end of said projecting stud whereby said bushing may be preloaded by adjusting said movable abutment to compress said bushing between said movable abutment and said first abutment, and a thin-walled semi-resilient flexible, self-lubricating plastic bushing sleeve mounted between one of said members and said resilient bushing whereby a snug wear take-up bearing fit is provided between said one member and said bushing sleeve and whereby rotation is permitted between said first and second members.

6. A resilient shimmy damping joint comprising a first control member and a second control member mounted for pivotal movement relative to each other, one of said members having a stud secured thereto and the other of said members having a bore extending therethrough for cooperation with said stud, resilient bushing means positioned within said bore between said stud and said other member, and a thin-walled flexible self-lubricating plastic liner positioned between said bushing and one of said control members, said bushing being preloaded to provide a resilient force acting to conform said liner snugly against said one control member for a snug wear take-up bearing fit therewith.

References Cited in the file of this patent

UNITED STATES PATENTS

| | | |
|---|---|---|
| 2,290,678 | Dodge | July 21, 1942 |
| 2,400,238 | Leighton | May 14, 1946 |
| 2,659,619 | Kishline et al. | Nov. 17, 1953 |
| 2,660,908 | French et al. | Dec. 1, 1953 |
| 2,666,677 | Miller | Jan. 19, 1954 |
| 2,675,283 | Thomson | Apr. 13, 1954 |